US010891439B2

(12) United States Patent
Cheung et al.

(10) Patent No.: US 10,891,439 B2
(45) **Date of Patent: *Jan. 12, 2021**

(54) SIGNAL ANALYSIS IN A CONVERSATIONAL SCHEDULING ASSISTANT COMPUTING SYSTEM

(71) Applicant: Microsoft Technology Licensing, LLC, Redmond, WA (US)

(72) Inventors: Benjamin Gene Cheung, Menlo Park, CA (US); Andres Monroy-Hernandez, Seattle, WA (US); Todd Daniel Newman, Mercer Island, WA (US); Mayerber Loureiro De Carvalho Neto, Kirkland, WA (US); Michael Brian Palmer, Edmonds, WA (US); Pamela Bhattacharya, Redmond, WA (US); Justin Brooks Cranshaw, Seattle, WA (US); Charles Yin-Che Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/511,724

(22) Filed: Jul. 15, 2019

(65) Prior Publication Data

US 2019/0340244 A1 Nov. 7, 2019

Related U.S. Application Data

(63) Continuation of application No. 15/714,077, filed on Sep. 25, 2017, now Pat. No. 10,394,957.

(51) Int. Cl.
*G06F 40/30* (2020.01)
*G06F 16/9032* (2019.01)
(Continued)

(52) U.S. Cl.
CPC ........ *G06F 40/30* (2020.01); *G06F 16/90332* (2019.01); *G06Q 10/109* (2013.01);
(Continued)

(58) Field of Classification Search
CPC ...... H04L 51/00; H04L 51/36; G06F 17/2785
See application file for complete search history.

(56) References Cited

U.S. PATENT DOCUMENTS

2010/0082516 A1* 4/2010 Basu ........................ G06N 5/02 706/47
2013/0159228 A1* 6/2013 Meijer .................. G06N 20/00 706/14

(Continued)

*Primary Examiner* — Daniel Abebe
(74) *Attorney, Agent, or Firm* — Christopher J. Volkmann; Kelly, Holt & Christenson, PLLC

(57) ABSTRACT

A software agent, that is used to assist in providing a service, receives communications from a set of users that are attempting to use the software agent. The communications include communications that are interacting with the software agent, and communications that are not interacting with the software agent. The software agent performs natural language processing on all communications to identify such things as user sentiment, user concerns or other items in the content of the messages, and also to identify actions taken by the users in order to obtain a measure of user satisfaction with the software agent. One or more action signals are then generated based upon the identified user satisfaction with the software agent.

20 Claims, 8 Drawing Sheets

A

DETERMINE USER SATISFACTION 226

BASED ON DETECTED CONCERNS, SENTIMENT, RECOMMENDATIONS, COVERAGE, NON-SCHEDULING ENGAGEMENT(S), ETC. 228

IN EACH SCENARIO, CATEGORY, ETC. 230

OTHER 232

GENERATE CONTROL SIGNAL(S) BASED ON USER SATISFACTION 234

CONTROL UI LOGIC TO CONDUCT NATURAL LANGUAGE SURVEY 236

CONTROL UI LOGIC TO SUGGEST RECOMMENDING THE SERVICE TO OTHER USERS 238

CONTROL COMMUNICATION SYSTEM TO GENERATE INTERVENTION COMMUNICTION TO USER, SUPPORT PERSON, ETC. 242

CONTROL LOGIC TO AGGREGATE RESULTS OVER MULTIPLE USERS AND SURFACE AGGREGATED RESULTS 244

OTHER 246

END

(51) Int. Cl.
*H04L 12/58* (2006.01)
*G06Q 10/10* (2012.01)

(52) U.S. Cl.
CPC ............ *H04L 51/02* (2013.01); *H04L 51/046* (2013.01); *G06Q 10/107* (2013.01)

(56) References Cited

U.S. PATENT DOCUMENTS

2016/0292204 A1* 10/2016 Klemm ................ G06F 16/355
2018/0139158 A1* 5/2018 Eagleton .............. H04L 51/066

* cited by examiner

SIGNAL ANALYSIS IN A CONVERSATIONAL SCHEDULING ASSISTANT COMPUTING SYSTEM

CROSS-REFERENCE TO RELATED APPLICATION

The present application is a continuation of and claims priority of U.S. patent application Ser. No. 15/714,077, filed Sep. 25, 2017, the content of which is hereby incorporated by reference in its entirety.

BACKGROUND

Computing systems are currently in wide use. Some computing systems include such things as electronic mail (e-mail) computing systems, calendaring or scheduling computing systems, among a wide variety of others.

Also, some computing systems include digital agents, or personal digital assistants. These types of agents or assistants can include, for example, software agents or other bots that are computer programs that may provide an interface for human interaction, using natural language, and that may perform various tasks. They illustratively use natural language understanding logic to identify a linguistic meaning of the natural language inputs and to perform certain tasks for the user, automatically, based upon those natural language inputs. For instance, based on a natural language input, the agent or assistant can set reminders, answer questions by performing searches, interact with other services, among other things.

In performing these tasks, such agents or bots are often involved in conducting a conversation with a user in order to perform a service. For instance, some bots or agents may be used when a user is having a conversation with other users. By way of example, assume that a first user sends an electronic mail message (an e-mail message) to a group of other users asking whether they wish to see a movie or attend other entertainment on a particular date. In order to find activities that are available, it may be that one of the users or the group also sends an e-mail message (cc'ing all other users in the group) to a software agent that is configured to identify entertainment that is taking place at different venues on different dates. The software agent then surfaces, for the group, a set of entertainment activities that are taking place on that date, and may also assist the group in obtaining tickets. By way of example, the software agent may send an e-mail to the entire group indicating the set of entertainment activities and asking whether the software agent should procure tickets. If directed to do so, the software agent may conduct a dialog with one or more of the users to identify the number of tickets, the amount to be spent on the tickets, among other things. The software agent may then interact with a ticketing site to obtain the tickets.

It can be difficult to improve such computing systems, because it can be difficult to know what features the various users are satisfied with, and what features they may be dissatisfied with, and why. Some current systems request that users take a survey to provide feedback. However, surveys are often perceived by users as being cumbersome and time consuming. Therefore, only a relatively small set of users may actually take the survey so that the feedback is quite limited.

The discussion above is merely provided for general background information and is not intended to be used as an aid in determining the scope of the claimed subject matter.

SUMMARY

A software agent, that is used to assist in providing a service, receives communications from a set of users that are attempting to use the software agent. The communications include communications that are interacting with the software agent, and communications that are not interacting with the software agent. The software agent performs natural language processing on all communications to identify such things as user sentiment, user concerns or other items in the content of the messages, and also to identify actions taken by the users. The processing is performed in order to obtain a measure of user satisfaction with the software agent. One or more action signals are then generated based upon the identified user satisfaction with the software agent.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
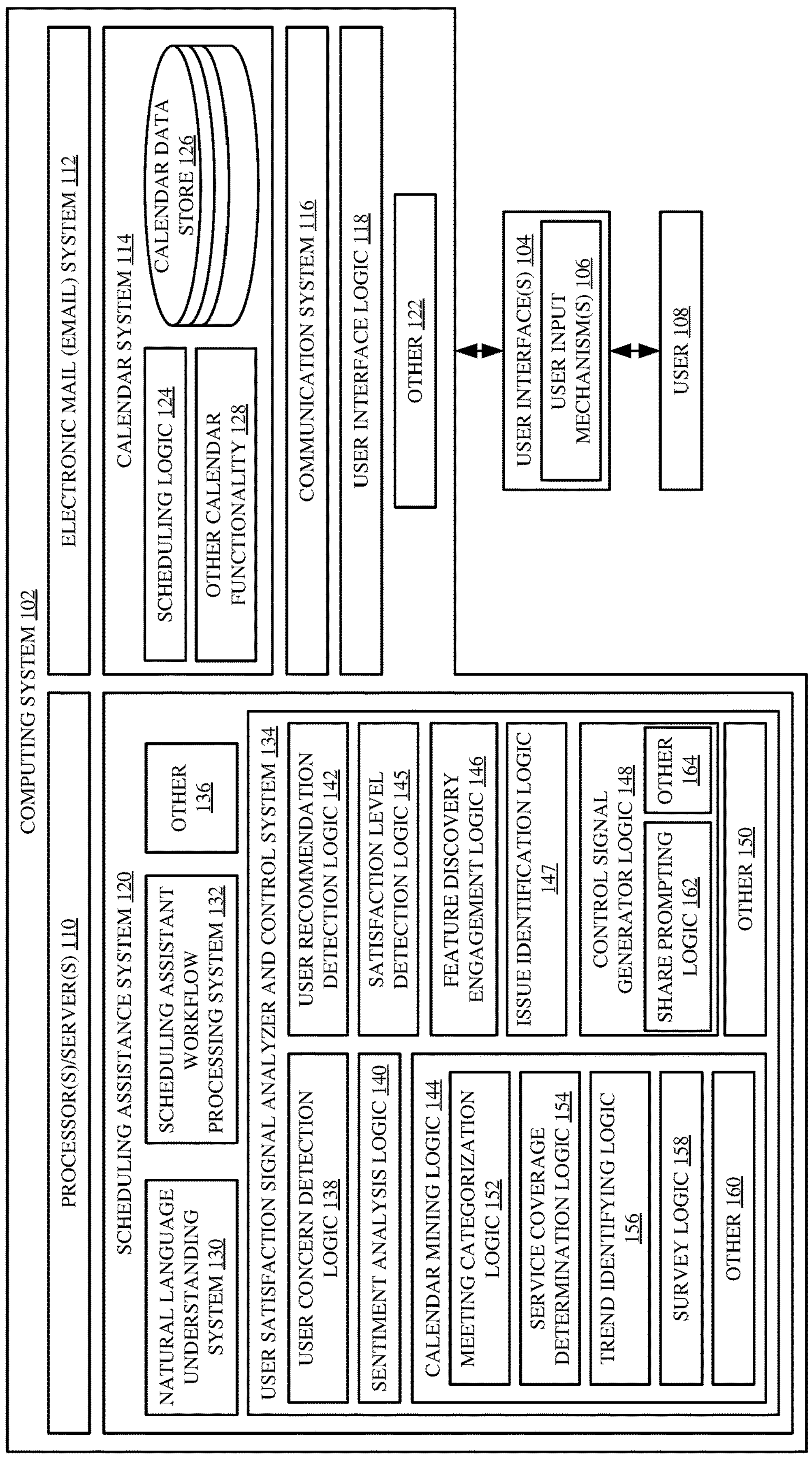
FIG. 1 is a block diagram of one example of a computing system architecture.

FIG. 1 is a block diagram of one example of a computing system architecture 100. Architecture 100 illustratively includes computing system 102 that generates user interfaces 104 with user input mechanisms 106 for interaction by user 108. User 108 illustratively interacts with user input mechanisms 106 in order to control and manipulate portions of computing system 102.

In the example illustrated in FIG. 1, computing system 102 illustratively includes one or more processors or servers 110, electronic mail (e-mail) system 112, calendar system 114, communication system 116, user interface logic 118, scheduling assistance system 120, and it can include a wide variety of other items 122, as well. Calendar system 114, itself, illustratively includes scheduling logic 124, calendar data 126 (which may be calendar data for user 108 and/or other users), and it can include a wide variety of other calendar functionality 128.

Scheduling assistance system 120 is illustratively a computing system that assists user 108 in interacting with calendar system 114, and the calendar systems of other users, in order to perform scheduling operations. In one example, user 108 illustratively interacts with scheduling assistance system 120 by sending messages to an inbox of scheduling assistance system 120 using e-mail system 112. However, in other examples, user 108 can communicate with scheduling assistance system 120 using other types of communication, such as natural language speech input, other messaging systems, etc.

Thus, scheduling assistance system 120 illustratively includes natural language understanding system 130 (which is shown as part of scheduling assistance system 120, but which can be separate therefrom, or a remote service that is accessed by system 120), scheduling assistance workflow processing system 132, user satisfaction signal analyzer and control system 134, and it can include other items 136. Before describing the operation of architecture 100 in more detail, a brief overview of some of the items in architecture 100, and their operation, will first be provided.

E-mail system 112 illustratively provides e-mail functionality for user 108. Therefore, in one example, user 108 can author, send, receive, open, and delete e-mail messages. User 108 can illustratively perform configuration operations to configure his or her mailbox and e-mail account, set filters, attach various attachments to different e-mail messages, and perform a wide variety of other e-mail functionality using e-mail system 112.

Scheduling logic 124 in calendar system 114 illustratively allows user 108 to schedule items on his or her calendar. The calendar data representing the calendar of user 108 is illustratively stored as calendar data in calendar data store 126. Calendar system 114 can provide a wide variety of other calendar functionality 128, such as the ability to send and receive meeting requests, schedule tasks and appointments, schedule meetings with a variety of different users, view the availability of other users, etc.

Communication system 116 illustratively allows computing system 102 to communicate with a wide variety of other computing systems. For instance, it can be a communication system that allows communication over a wide area network, a local area network, a cellular communication network, a near field communication network, or a wide variety of other networks or combinations of networks.

User interface logic 118 illustratively generates user interfaces 104 with user input mechanisms 106. It also illustratively detects user interaction with user input mechanisms 106 or any of a wide variety of other user input mechanisms. It can generate an indication of those user interactions and provide them to other parts of computing system 102 as well.

Scheduling assistance system 120 illustratively uses scheduling assistant workflow processing system 132 to detect when a user 108 requests system 120 to assist in scheduling an event, such as a meeting, a telephone call, etc. In one example, user 108 can do this by authoring a natural language e-mail message and sending it to a mailbox in e-mail system 120 corresponding to scheduling assistance system 120. When system 120 receives a message in its mailbox, it illustratively uses natural language understanding system 130 to parse the message and identify the linguistic content (e.g., the meaning) of the content in the e-mail message. It can then identify the message as either a message seeking interactions with system 120 or one that is not, but where system 120 was copied on the message.

When system 120 identifies the e-mail message as one seeking interaction with system 120 (such as a request to assist user 108 in performing a scheduling operation) scheduling assistant workflow processing system 132 illustratively performs a workflow that may involve having a dialog with user 108 (e.g., through e-mail system 112 or otherwise) to identify what user 108 wishes system 120 to do. This may include scheduling assistant workflow processing system 132 asking user 108 questions to identify the task to be performed.

System 132 can then perform operations, such as conducting information retrieval searches, searches of the calendar systems of various users, searches of other computing systems or databases, and return results. It can then perform other actions, such as interacting with scheduling logic 124 for user 108 and other users in order to schedule a meeting or another event, or it may interact with other computing systems to perform other functions (such as purchasing tickets, making reservations, among a wide variety of other things).

With systems such as scheduling assistance system 120, it can be difficult to determine the level of satisfaction that user 108 has with the system. Therefore, user satisfaction signal analyzer in control system 132 illustratively monitors various signals and actions from user 108 to determine the user's satisfaction. It can then generate control signals to take actions, based upon that satisfaction.

It will be appreciated that, for the sake of the present example, scheduling assistance system 120 need not be a scheduling assistance system, but may be another software agent or bot that is a participant in a conversation with one or more users, when it renders its service. For instance, instead of being a system that assists users in performing scheduling operations, it may be a system that assists users in performing translation operations in an e-mail discussion among a number of users that speak different languages. It may be a system that assists users in ordering lunch, scheduling one or more different venues, purchasing airline tickets or tickets to events, or a wide variety of other systems that participate in a conversation with a set of users, in order to perform the desired service. For purposes of example only, the present description proceeds with respect to scheduling assistance system 120 being a system that assists one or more users in scheduling items. However, the same processing can be applied to other types of assistive systems or other software agents or software programs that participate in a discussion with the users that are using the service that it provides.

User satisfaction signal analyzer and control system 134 illustratively includes user concern detection logic 138, sentiment analysis logic 140, user recommendation detection logic 142, calendar mining logic 144, satisfaction level detection logic 145, feature discovery engagement logic 146, issue identification logic 147, control signal generator logic 148, and it can include a wide variety of other items 150. Calendar mining logic 144, itself, illustratively includes meeting categorization logic 152, service coverage determination logic 154, trend identifying logic 156, survey logic 158, and it can include other items 160. Control signal generator logic 148, itself, illustratively includes share prompting logic 162, and it can include a wide variety of other items 164.

It will first be noted, that in one example, scheduling assistance system 120 may be included or copied on messages that not only relate directly to the scheduling assistance service that is provided by system 120, and that expressly seek interaction with system 120, but also on other messages in a communication thread that are not necessarily seeking interaction with system 120. For instance, it may be that user 108 sends an e-mail message to a group of other users, and also to system 120 specifically requesting that system 120 assist the group in scheduling a meeting. By way of example, a user may type "Scheduling Assistant, please help us schedule a meeting." Scheduling assistant workflow processing system 132 then beings executing its workflow to identify the particulars of the meeting, and to identify various meeting opportunities during which the meeting can be scheduled. In doing so, it may generate e-mails back to the group of users in the conversation, and receive responses from those users.

However, it may also be that the users who are participating in the conversation may generate messages for one another, copying system 120 on the messages, but not seeking direct interaction with system 120. For instance, it may be that one of the users sends a question to the entire group of users saying "What is your favorite restaurant near the meeting location?" While this communication may be copied to system 120, it is not seeking any interaction with system 120. Instead, it is seeking interaction with the other users. Likewise, one of the users may type a message to all of the other users, and copying system 120, that provides an indication as to the user's satisfaction level with system 120. For instance, assuming that system 120 is named "The ACME Scheduling Assistant", one of the users may type a message such as "This ACME Scheduling Assistant is very slow." Or "This ACME Scheduling Assistant is really helpful." Thus, even though the author of that message is not seeking interaction with system 120, the content of the message, itself, can be analyzed to identify the satisfaction level of that user, with system 120.

Similarly, the actions of the users in the conversation may also give an indication as to their satisfaction level with system 120. For instance, if one of the users sends an email recommending that other users use "The ACME Scheduling Assistant", this may indicate that the satisfaction level of the author of that message is relatively high. However, if the user sends a message such as "Do you know of any other scheduling assistants that we might user?", this may indicate that the satisfaction of that user is relatively low.

Further, it may be that, if a user is using system 120 to schedule a majority of his or her appointments on his or her calendar, this may indicate that the user is relatively satisfied with system 120. However, if the user is using system 120 to schedule only a small number of appointments on their calendar, relative to all appointments that are on the user's schedule, that may indicate that the user is relatively unsatisfied with system 120.

Further, it may be that a user is using system 120 to schedule a certain proportion of his or her meetings in one category (such as work meetings), but using system 120 to schedule a much different proportion of his or her meetings in a different category (such as personal meetings or phone calls, etc.). This may indicate that the user is relatively satisfied when using system 120 to perform operations in certain categories of operation, but is relatively unsatisfied when using system 120 to perform operations in one or more other categories of operations.

Similarly, the usage trend of a user in using system 120 may be helpful as well. If the user is tending to use system 120 more often, then this may be a positive trend indicating that the user is relatively satisfied with system 120. However, if the trend is negative, in that the user is using system 120 less often, then this may indicate that the user is not as well satisfied with system 120.

Further, it may be that user 108 is engaging with system 120 in different ways. For instance, it may be that the user is engaging with system 120 to perform one set of functions (such as to schedule meetings), but is also engaging with system 120 in an attempt to find out what other types of features system 120 can be used to perform. By way of example, it may be that user 108 asks system 120 (such as by typing an e-mail and sending it to the mailbox for system 120) whether system 120 can also be used to "Find entertainment options", to "Schedule phone conferences", etc. If user 108 is engaging with system 120 to find out how else user 108 may use system 120, this may be an indication that user 108 is relatively satisfied with system 120, or it may be an indication that additional or different features should be enabled or added to system 120.

It can thus be seen that it is not only direct feedback about the performance or satisfaction level of system 120 that is helpful in determining a user's satisfaction level. Instead, the content of all messages that system 120 receives may be analyzed to determine whether they indicate a user satisfaction level. The communications with system 120 that are directly seeking its engagement, as well as communications received by system 120, but which are not seeking its engagement, can be helpful in this regard. In addition, not only can the contents of the communications from the various users be used to determine user satisfaction, but user actions can also be used. In one example, user satisfaction signal analyzer and control system 134 captures signals indicative of the content of the communications and the user actions, and identifies one or more user satisfaction levels. It can also generate control signals to take action or control steps based upon the identified user satisfaction.

For instance, user concern detection logic 138 can detect when the content of a user's message indicates that the user is concerned about a particular function or feature or part of system 120. By way of example, it may be that the user types "This ACME Scheduling Assistant is very complicated to use." This may indicate that the user has a concern with the interface provided by system 120, or with other parts of the interactive process. Sentiment analysis logic 140 can be used to detect user sentiment in the contents of his or her messages. For instance, there are a wide variety of different types of sentiment analyzers that can be used to analyze the sentiment in text. Sentiment analysis logic 140 illustratively determines the correlation between user sentiments identified in the messages of the users and system 120. If the sentiment is highly correlated to system 120, then the message may indicate the user's sentiment with respect to the performance of system 120. User recommendation detection logic 142 illustratively detects when a user recommends that other users use system 120. It can also detect when a user is attempting to influence other users not to use system 120.

Calendar mining logic 144 illustratively mines the calendar data in calendar data store 126 for the various users that are using system 120. Meeting categorization logic 152 can identify different meeting categories that are on a user's calendar (such as in-person meetings, telephone conferences, business lunch meetings, personal meetings, etc.). Service coverage determination logic 154 can determine a measure indicative of how often user 108 used system 120 to schedule those meetings, in the different categories, relative to how often the user is not using system 120. Trend identifying logic 156 illustratively identifies trends in usage, over time, by user 108 (or other users of system 120).

Survey logic 158 can be used to control scheduling assistant workflow processing system 132 to request that a user complete a survey that asks more detailed questions about the user's satisfaction level with system 120. The users can be identified for taking the survey based upon the satisfaction level that has been determined for the user, based upon the user's usage of system 120, or in other ways.

Feature discovery engagement logic 146 illustratively identifies communications that are engaging system 120 in a way in which the user 108 is seeking to identify additional features that may be offered by system 120. This category of engagement with system 120 can be indicative of user satisfaction.

Satisfaction level detection logic 148 illustratively detects a satisfaction level for a user 108, given the information detected by one or more of user concern detection logic 138, sentiment analysis logic 140, user recommendation detection logic 142, calendar mining logic 144, survey logic 158, feature discovery engagement logic 146, and any other items of information. Issue identification logic 147 can use the same or different information to identify any particular issues with which the user may be concerned, with respect to interacting with, and using, system 120.

Control signal generator logic 148 can then generate various control signals based on the satisfaction level for a given user, based upon the issues identified for a given user, or based on other items. For instance, share prompting logic 162 can control scheduling assistant workflow processing system 132 to generate a communication with user 108 prompting, or suggesting that, the user recommend system 120 to other users. For instance, if the user is determined to be highly satisfied with system 120, then it may be that the user will likely follow the suggestion or prompt, and recommend system 120 to other users. A wide variety of other control signals can be generated based upon the identified user satisfaction level and any issues identified for a particular user.

Figure 2A:
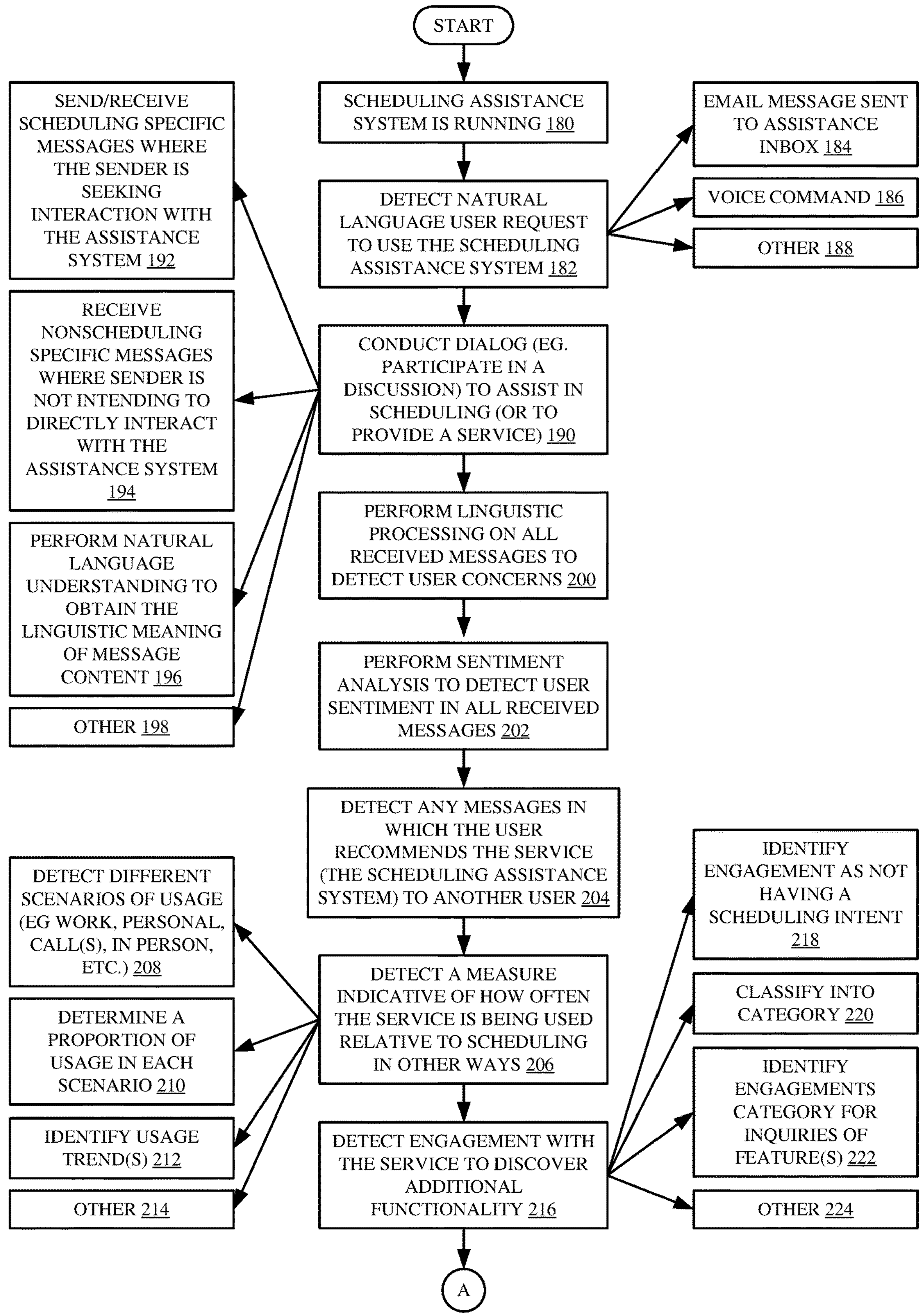
FIGS. 2A and 2B (collectively referred to herein as FIG. 2) show a flow diagram illustrating one example of the operation of the architecture illustrated in FIG. 1 in analyzing different signals to identify user satisfaction and generating control signals based upon the user satisfaction identified.
Figure 2B:
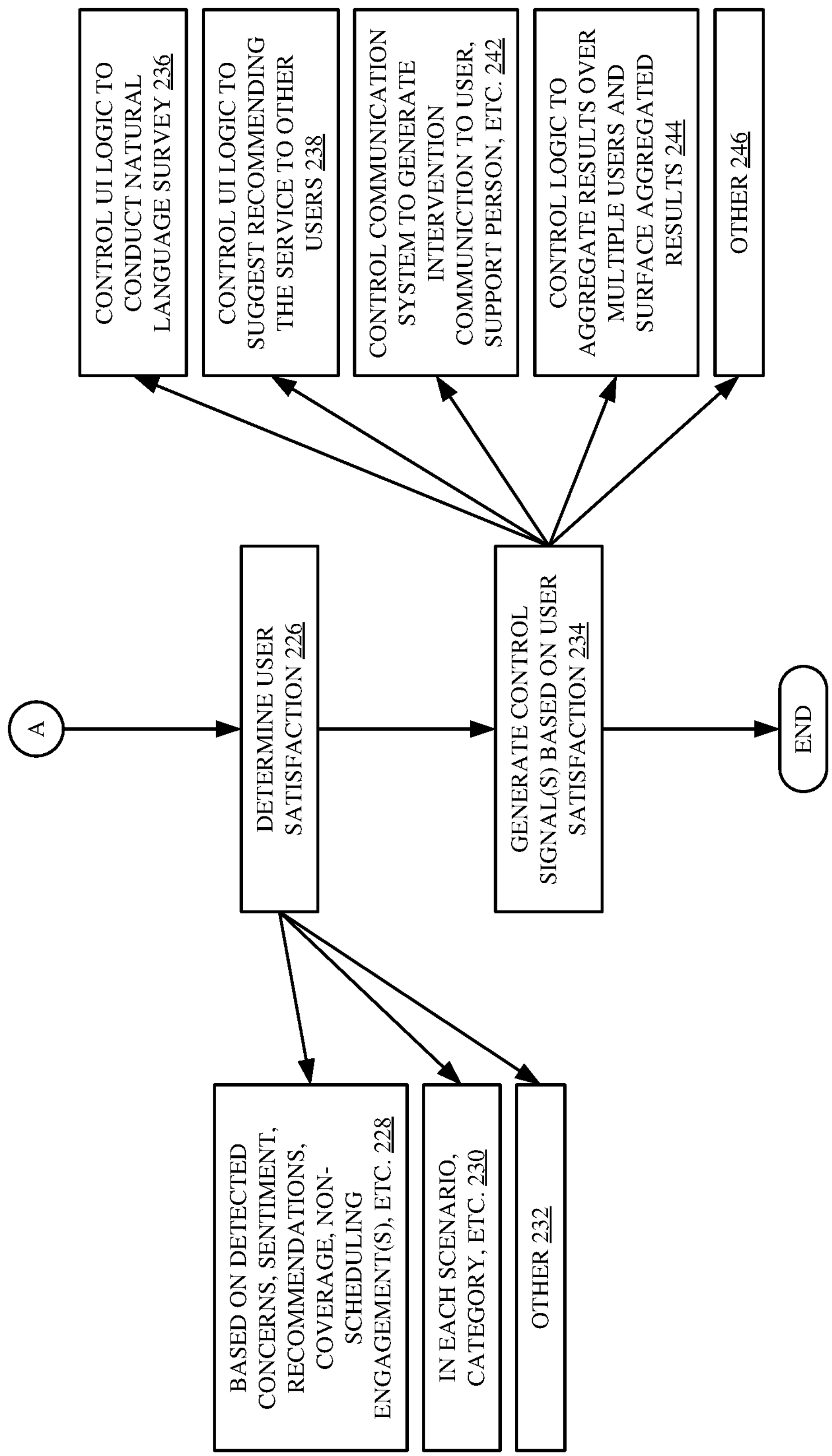

FIG. 2 is a flow diagram illustrating one example of the operation of the architecture shown in FIG. 1, in more detail. FIGS. 1 and 2 will now be described in conjunction with one another.

It is first assumed that scheduling assistance system 120 is running and is available for interaction by user 108. This is indicated by block 180 in the flow diagram of FIG. 2. It may be, as mentioned above, that system 120 is a software agent, or an intelligent digital assistant or web bot or other such computing system. It is illustratively a system that receives communications from a group of users who are attempting to use the service that it provides. It receives communications from those users, even when they are not directly attempting to interact with system 120, once they have asked for system 120 to assist them in providing a service.

Natural language understanding system 130 then illustratively detects a request message from a user, requesting to use the scheduling assistance system 120. This is indicated by block 182. By way of example, it may be that system 120 detects an e-mail message sent to its inbox as indicted by block 184. It may detect a voice command 186 or another type of communication 188. Natural language understanding system 130 then identifies the linguistic meaning of that request as a request for assistance by system 120.

Scheduling assistant workflow processing system 130 then conducts a dialog (such as by participating in a discussion with a group of users) to assist in scheduling something for the users, based upon the request. Of course, where system 120 is another type of assistant, bot, computer agent, etc., then it conducts a dialog to assist is providing another type of service. Conducting the dialog is indicated by block 190 in the flow diagram of FIG. 2.

In one example, scheduling assistant workflow processing system 132 sends and receives scheduling-specific messages (or messages where users are attempting to interact with system 120). This is indicated by block 192. Also, in one example, system 120 receives non-scheduling-specific messages (or messages where the users may be communicating with one another, but are not attempting to interact with system 120). This is indicated by block 194. Again, as discussed above, this may be messages where the users are communicating with one another, but not necessarily intending for system 120 to act on those messages, or to otherwise interact with them.

Natural language understanding system 130 then performs natural language understanding to obtain the linguistic meaning of the message content of all the received messages (and not just the messages where interaction with system 120 is intended or sought). Obtaining the linguistic meaning of the message content is indicated by block 196. The dialog can be conducted in a wide variety of other ways as well, and this is indicated by block 198.

User concern detection logic 138 receives the linguistic meaning of the content and performs linguistic processing on all the received messages to detect any user concerns with system 120. This is indicated by block 200. For instance, it may be that certain words (or other linguistic units) trigger rules or mappings that map to issues of concern. When user concern detection logic 138 sees those words in the linguistic meaning of the content of the messages, then it may access those mappings or rules to identify the concerns being expressed by the user. The user concerns may be identified by a dynamic model or in other ways as well.

Sentiment analysis logic 140 also performs sentiment analysis on the content of the received messages. For instance, it may identify different categories of sentiment, such as favorable, strongly favorable, disfavorable, strongly disfavorable, negative, positive, angry, or a wide variety of other sentiments, based upon the content of the received messages. Performing sentiment analysis to detect the sentiment in all received messages is indicated by block 202. Both user concern detection logic 138 and sentiment analysis logic 140 illustratively provide an output signal indicative of any detected sentiment and user concerns. In one example, they correlate the information to the particular user and to any particular categories or features of operation of assistance system 120. By way of example, it may be that a user comments that a particular feature of system 120 is very useful, or not very useful, etc. In that case, user concern detection logic 138 may identify the particular feature that the user is concerned with as described above, and sentiment analysis logic 140 may identify a strong positive or strong negative (or other) sentiment associated with that feature, for that user.

User recommendation detection logic 142 also detects any messages where a user is recommending system 120 for use by other users. It also generates an output signal indicative of the fact that the user has recommended system 120. It may provide other information as well, such as the number of users that system 120 was recommended to, among other things. Detecting any messages in which the user recommends the service (e.g., system 120) to another user is indicated by block 204.

Calendar mining logic 144 then mines the calendar information in calendar data store 126 to generate a measure indicative of how often the service is being used by the user, relative to scheduling in other ways. This is indicated by block 206. In one example, system 120 has access to the user's calendar data, and can therefore count the number of meetings or other calendar items that have been scheduled. It also illustratively tracks which of those items have been scheduled by user 108 using system 120. It can then generate a measure indicative of what proportion of the time user 108 is using system 120 to schedule different calendar items.

In one example, meeting categorization logic 152 detects different scenarios of usage, such as different categories of meetings that the user is scheduling. These may include work meetings, personal meetings, telephone calls, in-person meetings, off-site meetings, etc. Detecting different scenarios or categories of usage is indicated by block 208.

Service coverage determination logic 154 then determines a proportion or other measure of usage, in each of the identified categories. For instance, it may be that user 108 is using system 120 a relatively large amount of the time (relative to the user scheduling without the use of system 120) in order to schedule personal meetings, but a relatively small amount of the time in order to schedule work meetings. Determining a proportion of usage in each category or scenario is indicated by block 210.

Trend identifying logic 156 illustratively aggregates the usage proportions (or coverage information), over time, in order to determine whether the usage of user 108 in the different categories is increasing or decreasing as a proportion of the number of meetings or calendar items scheduled in those different categories. This is indicated by block 212. Detecting or generating a measure indicative of how often the service is being used relative to scheduling in other ways can be done in a wide variety of different ways, in addition or instead of those discussed above. This is indicated by block 214.

Calendar mining logic 144 illustratively generates output signals indicative of the various things detected. For instance, it can output a signal indicative of the different meeting categories or scenarios identified by logic 152. It can output a signal indicative of service coverage determined by logic 124, and the various trends identified by logic 156. It can output a wide variety of other information as well.

Feature discover engagement logic 146 also illustratively detects when the user engages with service 120 to discover additional functionality. This is indicated by block 216. For instance, it may identify the different categories or types of engagement that user 108 uses to engage with system 120. Those types of engagement may include, for instance, engaging system 120 to assist in scheduling a work meeting. They may also include engagement to inquire what other types of services or features system 120 may provide. Identifying engagement as not having a scheduling intent (or as an engagement where the user is not attempting to use system 120 to schedule a meeting) is indicated by block 218. The various types of engagement can be classified into different categories as indicated by block 220. The particular engagements that are inquiries into what various features may be provided by system 120 can then be identified. This is indicated by block 222. The number of engagements (or the level of those engagements measured in another way) may be indicative of user satisfaction. Detecting engagements with the service to discover additional functionality can be done in other ways as well. This is indicated by block 224.

Feature discovery engagement logic 146 can also generate a variety of different output signals. For instance, it may generate output signals indicative of the different categories of engagement that a particular user is using. It may output a signal indicative of the level of engagement where the user is seeking additional features. It can output other signals as well.

Based upon the various signals output by the different pieces of logic or systems discussed above, satisfaction detection logic 145 then illustratively determines a user satisfaction level for scheduling assistant system 120. This is indicated by block 226 in the flow diagram of FIG. 2. Again, it can be based on detected concerns, user sentiment, recommendations, a measure of coverage, non-scheduling engagements, and a wide variety of other items. This is indicated by block 228.

Satisfaction level detection logic 145 can also go on to determine additional detailed information. For instance, it may generate an output indicative of the satisfaction of a given user with each of the different categories or features of system 120, or with using system 120 in each of a plurality of different ways or under different scenarios. This is indicated by block 230. The user satisfaction can be determined in a wide variety of other ways as well, and this is indicated by block 232.

Satisfaction level detection logic 145 then illustratively outputs one or more signals indicative of the determined user satisfaction. For instance, it can output a signal indicative of the overall user satisfaction of user 108, with respect to system 120. It can output signals indicative of the user satisfaction corresponding to different features, the trends in the user satisfaction overall and corresponding to different features or categories or usage scenarios. It can also output a signal indicative of how confident it is with respect to the identified user satisfaction levels. For instance, if the user satisfaction levels are determined based on a relatively large amount of data, then the system may be more confident. Also, if the content of the messages or the actions are less ambiguous, then the confidence in the determined satisfaction level may be higher as well.

Based upon the information output by satisfaction level detection logic 145, and any other information, control signal generator logic 148 then generates one or more control signals. This is indicated by block 234. For instance, logic 148 can control survey logic 158, or user interface logic 118, or both, to conduct a natural language survey with one or more users, based upon their user satisfaction. This is indicated by block 236. Share prompting logic 162 can control user interface logic 118 to suggest that a particular user recommend the service to other users. This is indicated by block 238. For instance, it can use user interface logic 118 to generate a message (such as an e-mail message or other message) and surface that message for user 108 suggesting that user 108 recommend usage of system 120 to one or more other users. It may generate the message as a predefined suggestion that user 108 simply needs to forward to other users. The message may have a link where the other users can easily configure a system 120 for themselves, or otherwise.

Control signal generator logic 148 can also illustratively control communication system 116 to generate an intervention communication where the user satisfaction level warrants it. For instance, where a user is highly unsatisfied, then logic 148 may control communication system 116 to generate a communication to the unsatisfied user, or to a support person that may contact the unsatisfied user. Controlling communication system 116 to generate an intervention communication to the user, a support person, etc., is indicated by block 242.

Control signal generator logic 148 may also illustratively generate a control signal that is provided to a remote system or another part of computing system 102, that aggregates the results of the various items of logic and systems, over multiple users, and surfaces the aggregated results. This is indicated by block 244. For instance, the aggregation of results may reveal that a relatively large number of users have issues with a same set of features or functionality on system 120. It may also indicate that a relatively large number of users is seeking one or more additional items of functionality from system 120. It may indicate that a relatively large number of users have the same types of issues or concerns with respect to system 120. This, and a wide variety of other information, can be obtained from the aggregated satisfaction results.

Control signal generator logic 148 can generate control signals in a wide variety of other ways as well. This is indicated by block 246.

It can thus be seen that the present discussion enhances the computing system itself. The computing system is configured to capture a set of signals that can be used, or combined, to identify user satisfaction for different features or different portions of a computing system. This can be obtained not only from communications where users are attempting to engage with the computing system, but even where users are not attempting to directly engage with that system. In addition, a wide variety of different types of control signals can be generated based upon the signals captured.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 3:
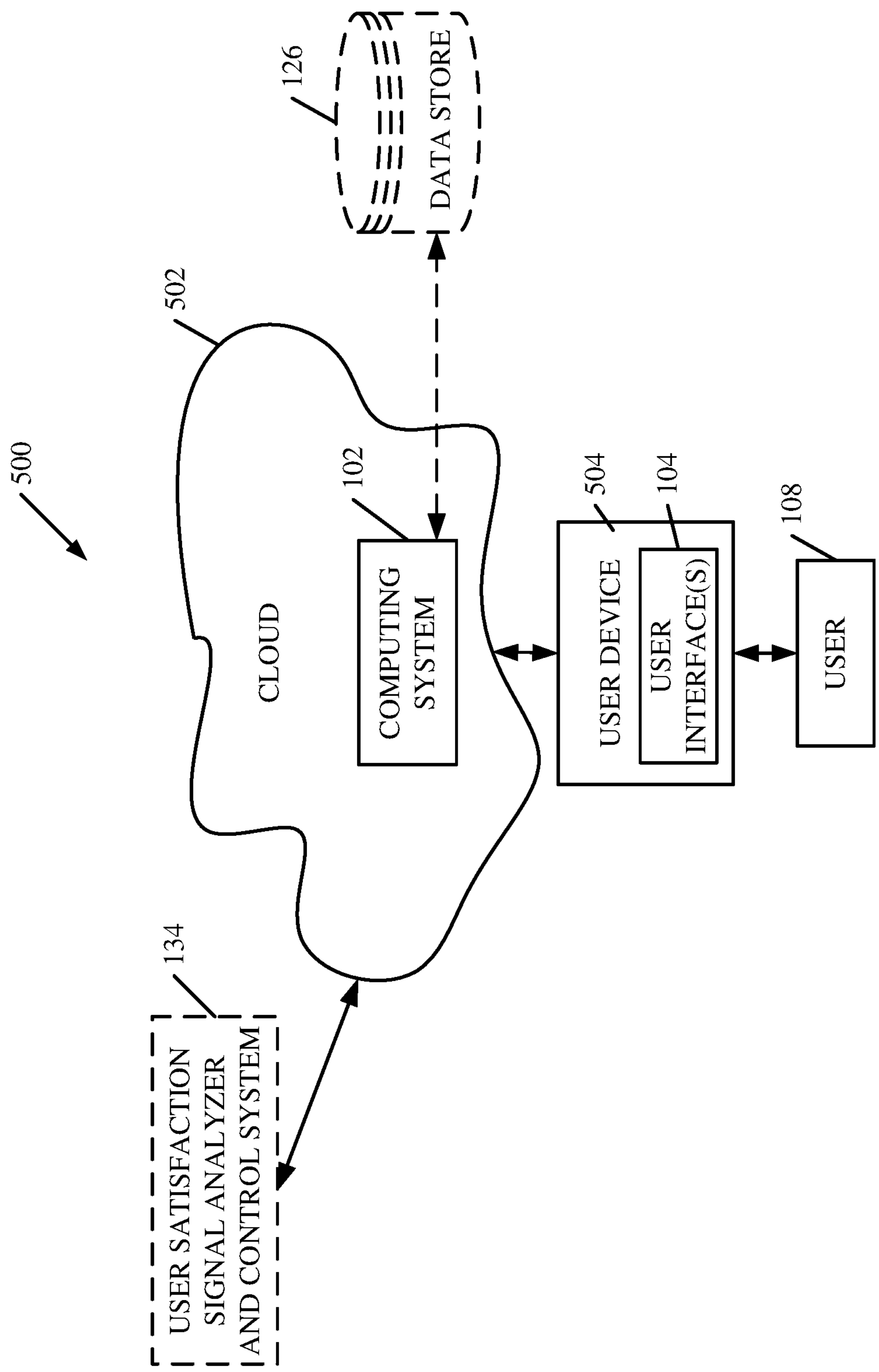
FIG. 3 is a block diagram showing one example of the architecture illustrated in FIG. 1, deployed in a cloud computing architecture.

FIG. 3 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 3, some items are similar to those shown in FIG. 1 and they are similarly numbered. FIG. 3 specifically shows that computing system 102 can be located in cloud 502 (which can be public, private, or a combination where portions are public while others are private). Therefore, user 108 uses a user device 504 to access those systems through cloud 502.

FIG. 3 also depicts another example of a cloud architecture. FIG. 3 shows that it is also contemplated that some elements of computing system 102 can be disposed in cloud 502 while others are not. By way of example, data store 126 can be disposed outside of cloud 502, and accessed through cloud 502. In another example, system 134 (or other items) can be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 4:
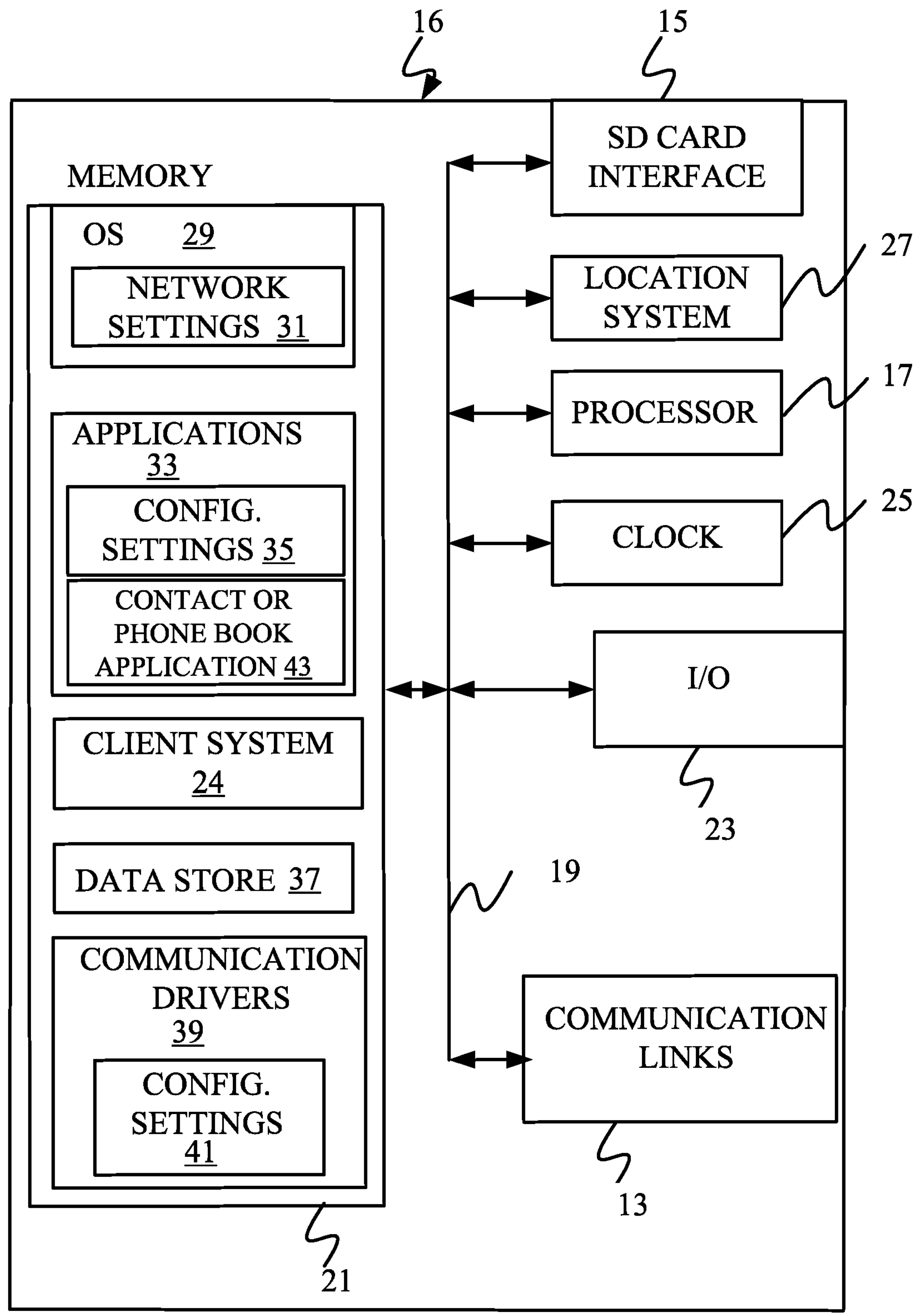
FIGS. 4-6 show examples of mobile devices that can be used in the architectures shown in the previous figures.
Figure 5:
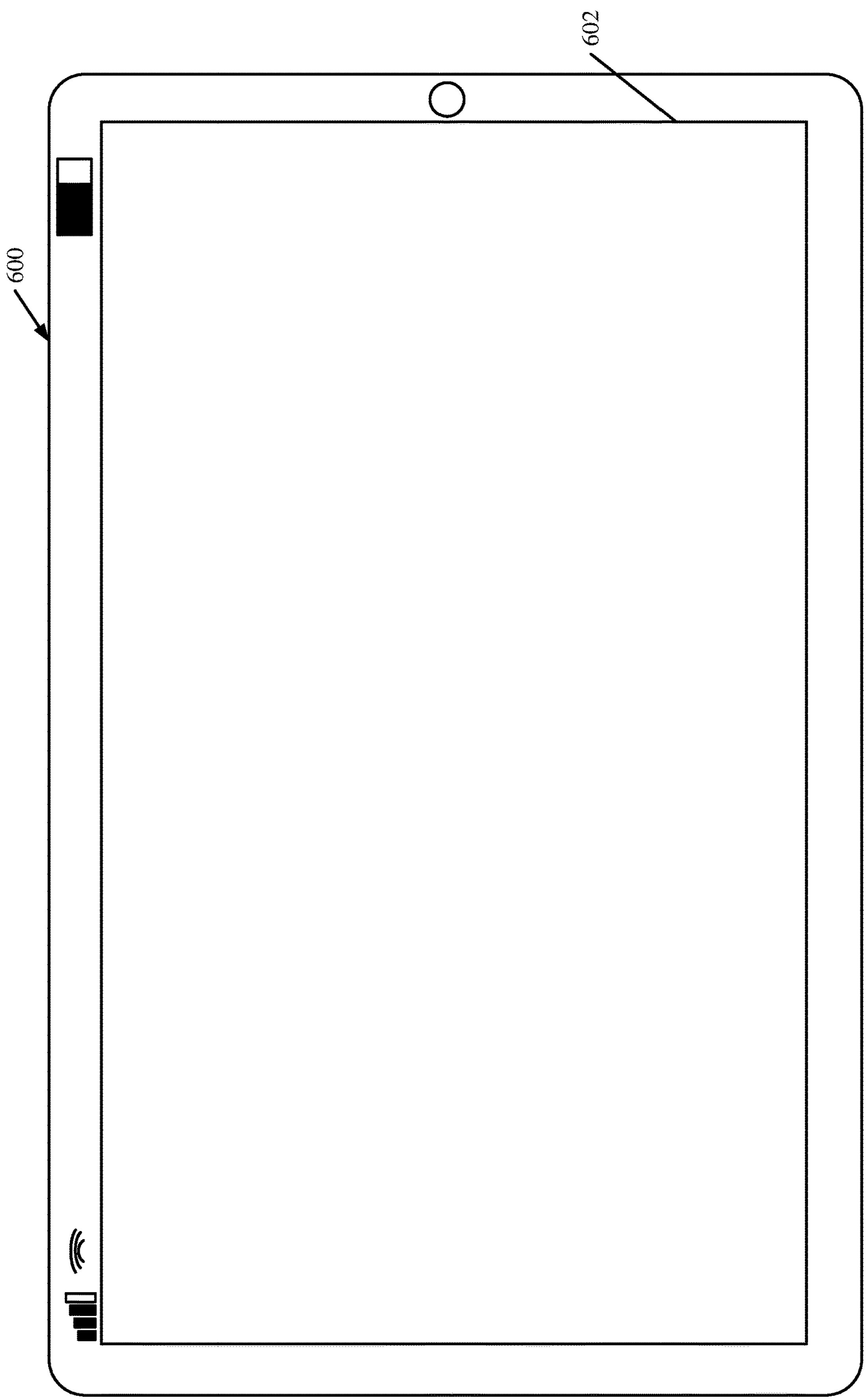
Figure 6:
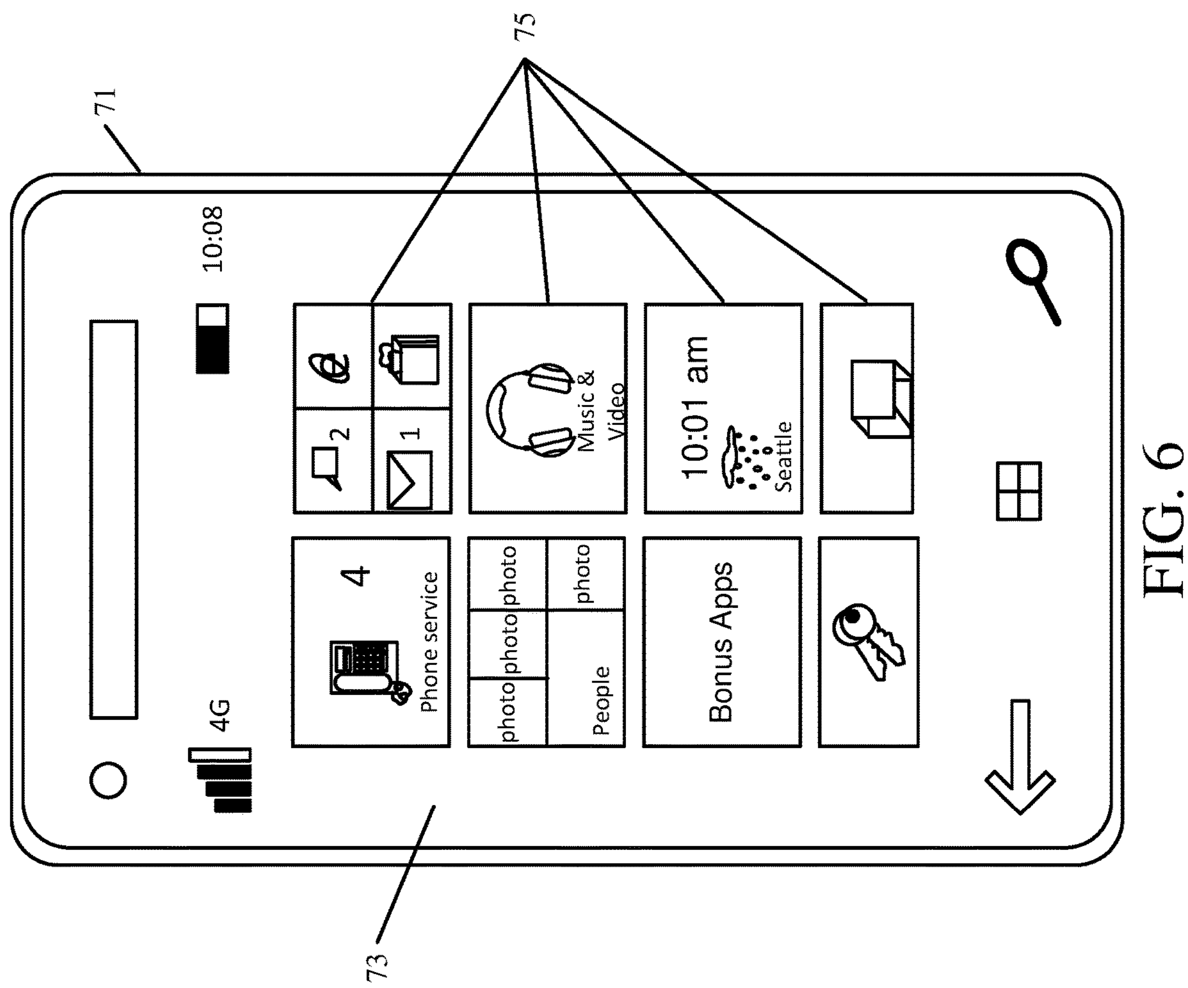

FIG. 4 is a simplified block diagram of one illustrative example of a handheld or mobile computing device that can be used as a user's or client's hand held device 16, in which the present system (or parts of it) can be deployed. FIGS. 5-6 are examples of handheld or mobile devices.

FIG. 4 provides a general block diagram of the components of a client device 16 that can run components computing system 102 or user device 504 or system 134 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 5 shows one example in which device 16 is a tablet computer 600. In FIG. 5, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 6 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 7:
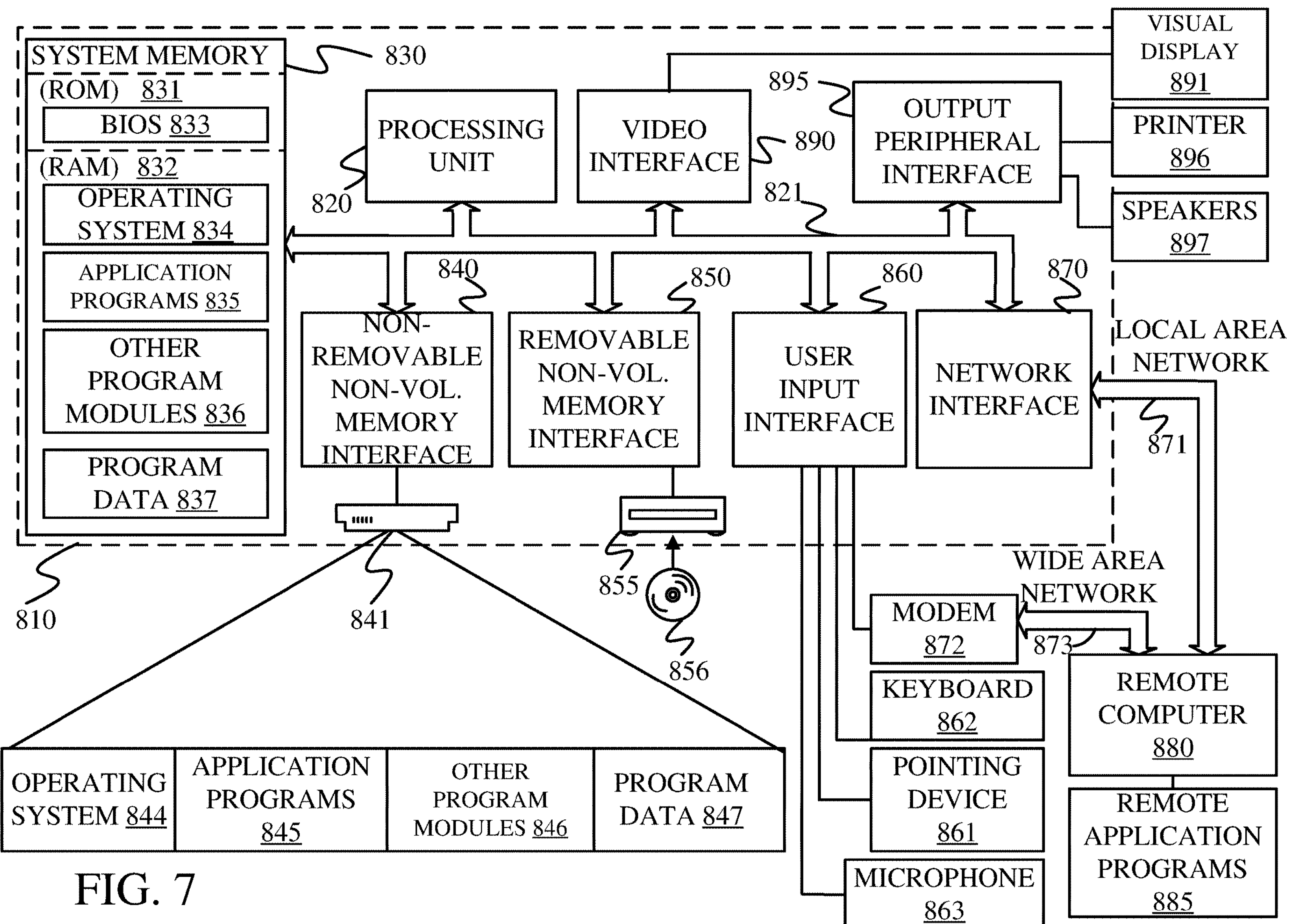
FIG. 7 is a block diagram showing one example of a computing environment that can be used in the architectures shown in the previous figures.

FIG. 7 is one example of a computing environment in which architecture 100, or parts of it, (for example) can be deployed. With reference to FIG. 7, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 7.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 7 illustrates operating system 834, application programs 835, other program modules 836, and program data 837.

The computer 810 may also include other removable/non-removable volatile/nonvolatile computer storage media. By way of example only, FIG. 7 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 7, provide storage of computer readable instructions, data structures, program modules and other data for the computer 810. In FIG. 7, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 7 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 7 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

a messaging system that sends and receives group messages among a plurality of different users in a group of users;

an assistance computing system that receives a natural language request message from the messaging system, indicative of a user request, from a requesting user in the group of users, for interaction with the assistance system and that conducts a dialog with a user, using the messaging system, to render a service in response to the natural language request message;

an analyzer system that detects other natural language messages, in addition to the natural language request message and messages in the dialog, from the plurality of different users in the group of users, generates satisfaction indicia indicative of user satisfaction corresponding to the assistance computing system based on a content of the other natural language messages, the natural language request message and messages in the dialog; and control signal generator logic that generates a control signal to control the computing system based on the satisfaction indicia.

Example 2 is the computing system of any or all previous examples wherein the control signal generator logic is configured to generate the control signal to control the messaging system to prompt the requesting user to recommend the assistance computing system to another user.

Example 3 is the computing system of any or all previous examples wherein the analyzer system comprises:

feature discovery engagement logic configured to identify a feature discovery natural language message inquiring about additional functionality offered by the assistance computing system and generating a feature discovery engagement indicator indicative of the feature discovery natural language message; and satisfaction level detection logic configured to generate the satisfaction indicia based on the feature discovery engagement indicator.

Example 4 is the computing system of any or all previous examples wherein the assistance computing system comprises a scheduling assistant configured to render a scheduling assistance service, and wherein the analyzer system comprises:

calendar mining logic configured to access calendar information corresponding to the requesting user to identify a usage level indicative of a level of usage of the scheduling assistant by the requesting user; and satisfaction level detection logic being configured to generate the satisfaction indicia based on the usage level.

Example 5 is the computing system of any or all previous examples wherein the calendar mining logic comprises:

service coverage determination logic configured to access the calendar information and identify how often the requesting user used the scheduling assistant in performing the scheduling operations relative to how often the user performed the scheduling operations without using the scheduling assistant to obtain a coverage indicator, the satisfaction level detection logic generating the satisfaction indicia based on the coverage indicator.

Example 6 is the computing system of any or all previous examples wherein the calendar mining logic comprises:

meeting categorization logic configured to access the calendar information and identify different categories of scheduling items for which the requesting user has performed the scheduling operation.

Example 7 is the computing system of any or all previous examples wherein the service coverage determination logic is configured to obtain the coverage indicator corresponding to each category of scheduling items.

Example 8 is the computing system of any or all previous examples wherein the calendar mining logic comprises:

trend identifying logic configured to identify a trend in how often the requesting user used the scheduling assistant in performing the scheduling operations relative to how often the user performed the scheduling operations without using the scheduling assistant.

Example 9 is the computing system of any or all previous examples wherein the analyzer system comprises:

user recommendation detection logic configured to detect whether the requesting user recommended the assistance computing system to other users and to generate a recommendation detected indicator, the satisfaction level detection logic being configured to generate the satisfaction indicia based on the recommendation detected indicator.

Example 10 is the computing system of any or all previous examples wherein the analyzer system comprises:

sentiment analysis logic configured to identify sentiment of the requesting user in the content of the messages and identify a correlation between the identified sentiment and the assistance computing system, the satisfaction level detection logic generating the satisfaction indicia based on the identified sentiment and the correlation to the assistance computing system.

Example 11 is the computing system of any or all previous examples wherein the sentiment analysis logic is configured to identify the sentiment of the requesting user in the content of the messages and identify a correlation between the identified sentiment and an individual feature of the assistance computing system, the satisfaction level detection logic generating the satisfaction indicia based on the identified sentiment and the correlation to the individual feature of the assistance computing system.

Example 12 is a computer implemented method, comprising:

receiving, at an assistance computing system, a natural language request message from a messaging system that sends and receives group messages among a plurality of different users in a group of users, the natural language request message being indicative of a user request, from a requesting user in the group of users, for interaction with the assistance system;

controlling the messaging system to conduct a dialog with a user to render a service in response to the natural language request message;

detecting other natural language messages, in addition to the natural language request message and messages in the dialog, from the plurality of different users in the group of users;

generating satisfaction indicia indicative of user satisfaction corresponding to the assistance computing system based on a content of the other natural language messages, the natural language request message and messages in the dialog; and generating a control signal to control the computing system based on the satisfaction indicia.

Example 13 is the computer implemented method of any or all previous examples wherein generating the control signal comprises:

generating the control signal to control the messaging system to prompt the requesting user to recommend the assistance computing system to another user.

Example 14 is the computer implemented method of any or all previous examples wherein generating satisfaction indicia comprises:

identifying a feature discovery natural language message inquiring about additional functionality offered by the assistance computing system;

generating a feature discovery engagement indicator indicative of the feature discovery natural language message; and generating the satisfaction indicia based on the feature discovery engagement indicator.

Example 15 is the computer implemented method of any or all previous examples wherein the assistance computing system comprises a scheduling assistant configured to render a scheduling assistance service, and wherein generating satisfaction indicia comprises:

accessing calendar information corresponding to the requesting user;

identifying a usage level indicative of a level of usage of the scheduling assistant by the requesting user; and generating the satisfaction indicia based on the usage level.

Example 16 is the computer implemented method of any or all previous examples wherein identifying a usage level comprises:

identifying the level of usage, from the calendar information, by identifying how often the requesting user used the scheduling assistant in performing the scheduling operations relative to how often the user performed the scheduling operations without using the scheduling assistant; and identifying a coverage indicator based on the level of usage.

Example 17 is the computer implemented method of any or all previous examples wherein identifying the usage level comprises:

identifying, from the calendar information, different categories of scheduling items for which the requesting user has performed the scheduling operation; and identifying the coverage indicator corresponding to each category of scheduling items.

Example 18 is the computer implemented method of any or all previous examples and further comprising:

identifying a trend in how often the requesting user used the scheduling assistant in performing the scheduling operations relative to how often the user performed the scheduling operations without using the scheduling assistant, in each of the categories of scheduling items, based on a set of coverage indicators corresponding to each of the categories of scheduling items.

Example 19 is the computer implemented method of any or all previous examples wherein generating satisfaction indicia comprises:

detecting whether the requesting user recommended the assistance computing system to other users;

generating a recommendation detected indicator; and generating the satisfaction indicia based on the recommendation detected indicator.

Example 20 is the computer implemented method of any or all previous examples wherein generating satisfaction indicia comprises:

identifying sentiment of the requesting user in the content of the messages;

identifying a correlation between the identified sentiment and the assistance computing system; and generating the satisfaction indicia based on the identified sentiment and the correlation to the assistance computing system.

Example 21 is a computing system, comprising:

a software agent that receives a natural language request message indicative of a request for interaction and that provides a service based on the natural language request for interaction;

a messaging system that conducts a conversation that has a set of messages sent from a user to the software agent, wherein at least one message in the set of messages comprises the natural language request message;

a signal analyzer that analyzes content of the natural language request message and other messages in the set of messages and generates satisfaction indicia indicative of user satisfaction corresponding to the assistance computing system based on the content of the natural language request message and other messages in the set of messages; and control signal generator logic that controls the messaging system based on the satisfaction indicia.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by an assistance computing system, the method comprising:

detecting a natural language request message from a user using a messaging system, wherein the natural language request message is indicative of a user request for a service;

conducting a dialog with the user, using the messaging system, to provide the service in response to the natural language request message, wherein conducting the dialog comprises rendering a set of messages from the service in response to a set of natural language messages from the user in the dialog and identifying a task in the service based on the set of natural language messages;

determining a satisfaction indicia indicative of user satisfaction corresponding to the assistance computing system based on content of at least one natural language message, other than the natural language request message, in the dialog; and controlling the dialog based on the satisfaction indicia.

2. The method of claim 1, wherein determining the satisfaction indicia comprises:

performing linguistic processing on the natural language request message and the natural language message to determine the satisfaction indicia corresponding to a user concern with the assistance computing system.

3. The computer implemented method of claim 1, and further comprising:

generating a survey with the user to determine the satisfaction indicia.

4. The computer implemented method of claim 1, wherein the natural language request message comprises a request to schedule a meeting.

5. The computer implemented method of claim 1, wherein the user comprises a first user in a group of users, and conducting a dialog comprises:

conducting the dialog with the group of users.

6. The method of claim 1, further comprising:

determining the satisfaction indicia based on how often the user uses the assistance computing system.

7. The method of claim 1, wherein controlling the dialog comprises:

prompting the user to recommend the assistance computing system to another user.

8. The method of claim 1, and further comprising:

detecting when the user recommends the software agent to a second user.

9. The method of claim 1, and further comprising:

mining calendar data stored in a calendar data store; and determining the satisfaction indicia based on how often the user uses the assistance computing system.

10. A computing system comprising:

a messaging system configured to send and receive messages with a user;

a software agent configured to:

conduct a dialog with the user, using the messaging system, to provide a service in response to a natural language request message indicative of a user request, render a set of messages from the service in response to a set of natural language messages from the user in the dialog, and identify a task in the service based on the set of natural language messages;

a signal analyzer configured to generate a satisfaction indicia indicative of user satisfaction corresponding to the software agent based on the natural language request message and the message content in the dialog; and control signal generator logic configured to generate a control signal to control the computing system based on the satisfaction indicia.

11. The computing system of claim 10, wherein the user comprises a first user in a group of users, and the software agent is configured to conduct the dialog with the group of users.

12. The computing system of claim 10, wherein the messaging system comprises an e-mail system.

13. The computing system of claim 10, wherein the messages with the user comprise group messages with a group of users.

14. The computing system of claim 10, wherein the signal analyzer comprises:

sentiment analysis logic configured to generate the satisfaction indicia corresponding to user sentiment based on the natural language request and the dialog.

15. The computing system of claim 10, wherein the signal analyzer comprises:

user recommendation logic configured to detect when the user recommends the software agent to a second user.

16. The computing system of claim 10, wherein the signal analyzer comprises:

calendar mining logic configured to mine calendar data stored in a calendar data store; and service coverage determination logic configured to determine the satisfaction indicia based on how often the user uses the software agent.

17. The computing system of claim 10, wherein the signal analyzer comprises:

user concern detection logic configured to perform linguistic processing on the natural language message to determine the satisfaction indicia corresponding to user concern with the software agent.

18. A computing system, comprising:

at least one processor; and memory storing instructions executable by the at least one processor, wherein the instructions, when executed, cause the computing system to:

conduct a dialog with user, using a messaging system, to:

render a service in response to a natural language request message indicative of a user request, render a set of messages from the service in response to a set of natural language messages from the user in the dialog, and identify a task in the service based on the set of natural language messages;

generate a satisfaction indicia indicative of user satisfaction corresponding to the computing system based on the natural language request message and one or more other natural language messages, other than the natural language request message, in the dialog; and generate a control signal to control the computing system based on the satisfaction indicia.

19. The computing system of claim 18, wherein the instructions configure the computing system to:

perform linguistic processing on the natural language request message and one or more other natural language messages in the dialog to determine the satisfaction indicia corresponding to a user concern with the dialog.

20. The computing system of claim 18, wherein the natural language request message comprises a request to make a reservation.

* * * * *